United States Patent
Boulton et al.

(10) Patent No.: US 9,015,386 B2
(45) Date of Patent: Apr. 21, 2015

(54) CONNECTED VEHICLE APPLICATION TESTING IN THE LABORATORY

(71) Applicant: Spirent Communications, Inc., Sunnyvale, CA (US)

(72) Inventors: Peter George Boulton, Paignton (GB); John Pottle, Newton Abbot (GB)

(73) Assignee: Spirent Communications, Inc., Sunnyvale, CA (US)

( * ) Notice: Subject to any disclaimer, the term of this patent is extended or adjusted under 35 U.S.C. 154(b) by 0 days.

(21) Appl. No.: 13/926,930

(22) Filed: Jun. 25, 2013

(65) Prior Publication Data

US 2013/0345926 A1    Dec. 26, 2013

Related U.S. Application Data

(60) Provisional application No. 61/664,014, filed on Jun. 25, 2012.

(51) Int. Cl.
G06F 19/00 (2011.01)
G01M 17/007 (2006.01)
G08G 1/01 (2006.01)

(52) U.S. Cl.
CPC .......... *G01M 17/007* (2013.01); *G08G 1/0112* (2013.01); *G08G 1/0116* (2013.01)

(58) Field of Classification Search
CPC ....................... G01M 17/007; G06F 2212/173
USPC ............................................................ 710/62
See application file for complete search history.

(56) References Cited

U.S. PATENT DOCUMENTS

| | | | |
|---|---|---|---|
| 6,560,459 B1* | 5/2003 | Wong | 455/447 |
| 7,797,132 B1* | 9/2010 | Lele et al. | 702/182 |
| 2002/0066055 A1* | 5/2002 | Kim | 714/704 |
| 2003/0061018 A1* | 3/2003 | Snyder | 703/22 |
| 2006/0040616 A1* | 2/2006 | Wheatley | 455/67.11 |
| 2006/0046658 A1* | 3/2006 | Cruz et al. | 455/67.11 |
| 2010/0106745 A1* | 4/2010 | Cho et al. | 707/802 |
| 2013/0021912 A1* | 1/2013 | Finlow-Bates et al. | 370/241 |

* cited by examiner

*Primary Examiner* — Henry Tsai
*Assistant Examiner* — John Roche
(74) *Attorney, Agent, or Firm* — Haynes, Beffel & Wolfeld LLP; Ernest J. Beffel, Jr.

(57) ABSTRACT

The technology disclosed relates to testing of connected vehicle systems. The connections involved are sometimes referred to as Car-2-Car (C2C), Vehicle-to-Vehicle (V2V), Car-2-Infrastructure (C2I), or Vehicle-to-Infrastructure (V2I). More generically, the connections are referred to as C2X and V2X. The technology disclosed provides an over the wire simulation of signals that a system will receive in operation, which allows testing of algorithms, breadboards, prototypes and complete systems. The system simulates the position of multiple on board units as the move with the vehicles that carry them. It attenuates signals between the OBUs and can attenuate signals among the OBUs and other test components, including roadside units and synthetic OBUs. The simulation is can be practiced as a method, a device, or computer readable medium that causes a device to practice the method or that, when combined with appropriate hardware, produces the device.

16 Claims, 3 Drawing Sheets

CONNECTED VEHICLE APPLICATION TESTING IN THE LABORATORY

RELATED APPLICATIONS

This application claims the benefit of U.S. Prov. App. No. 61/664,014 filed Jun. 25, 2012, with the same title and inventors as this application, which is hereby incorporated by reference.

This application builds on technologies found in previous applications that could be considered related. The following prior applications are identified. PCT Publication WO 2010/093999 A2, published Aug. 19, 2010, "Method and Apparatus for Virtual Desktop OTA [Over the Air]"; U.S. App. No. 12/850,986 (unpublished), filed Aug. 5, 2010, "Virtual Drive Test Tool"; and U.S. Pub. 2011/0257923 A1, published Oct. 20, 2011. These three previous applications are hereby incorporated by reference.

BACKGROUND

1. Field

The technology disclosed relates to testing of connected vehicle systems. The connections involved are sometimes referred to as Car-2-Car (C2C), Vehicle-to-Vehicle (V2V), Car-2-Infrastructure (C2I), or Vehicle-to-Infrastructure (V2I). More generically, the connections are referred to as C2X and V2X. The technology disclosed provides an over the wire simulation of signals that a system will receive in operation, which allows testing of algorithms, breadboards, prototypes and complete systems.

2. Related Art

The ever-growing use of motor vehicles on road networks that have limited capacity which itself can only grow at a much slower rate has increased the need to manage traffic flows, and the impact on traffic flows of vehicular accidents, and to increase the overall efficiency of such networks. One of the initiatives around this goal is the connected vehicle that exchanges data with other vehicles and with infrastructure.

Connected vehicles are equipped with radio communication links which can form ad-hoc communications networks with other similarly-equipped vehicles, automatically exchanging positional and other information that can be used to support traffic management or automatic accident-avoidance and warning schemes, for example. This network can also include roadside infrastructure capable of broadcasting and receiving wide area data and other information as well as more targeted data to individual vehicles or other localized data such as the state of traffic lights. In this network, on-board systems are designed to work co-operatively.

Such a radio network, whilst appearing a simple concept on first inspection, presents significant challenges both technological and logistical. Radio signals are prone to interference and blockage in the types of environments where motor vehicles operate and may have limited range. Integration of complex systems into motor vehicles is difficult unless conducted during manufacture, so it will take some considerable time to create penetration rates where there are enough connected vehicles to enable associated strategies to be effective. There will always be cases where connected vehicles are operating in an environment which includes unconnected vehicles.

In order to develop these systems to the point where they are effective and can be deployed, the traditional approach has been to conduct extensive vehicular experiments, trials and research at test tracks or in some cases on actual road networks. This approach is almost always a compromise. Test tracks offer only limited scope to cover the vast array of situations to be researched. On live road networks, the full range of situations cannot be created without disruption or introduction of safety hazards. Such trials are invariably expensive in terms of provision of physical assets and human resources. Also, prototype transmitters may fall short of the performance expected of deployable units especially in the areas of transmitter power.

To mitigate this, computer simulations may be conducted to create a very wide range of typical scenarios and to assist in the development and verification of algorithms and strategies. However, such simulations almost never include actual radio network and other hardware and associated sensors and represent a further compromise as a result.

It is desirable to provide new modes of testing that are cost effective and that exercise the systems being tested.

SUMMARY

The technology disclosed relates to testing of connected vehicle systems. The connections involved are sometimes referred to as Car-2-Car (C2C), Vehicle-to-Vehicle (V2V), Car-2-Infrastructure (C2I), or Vehicle-to-Infrastructure (V2I). More generically, the connections are referred to as C2X and V2X. The technology disclosed provides an over the wire simulation of signals that a system will receive in operation, which allows testing of algorithms, breadboards, prototypes and complete systems. The system simulates the position of multiple on board units as the move with the vehicles that carry them. It attenuates signals between the OBUs and can attenuate signals among the OBUs and other test components, including roadside units and synthetic OBUs. The simulation is can be practiced as a method, a device, or computer readable medium that causes a device to practice the method or that, when combined with appropriate hardware, produces the device. Other aspects and advantages of the technology disclosed can be seen on review of the drawings, the detailed description and the claims, which follow.

DETAILED DESCRIPTION

Figure 1:
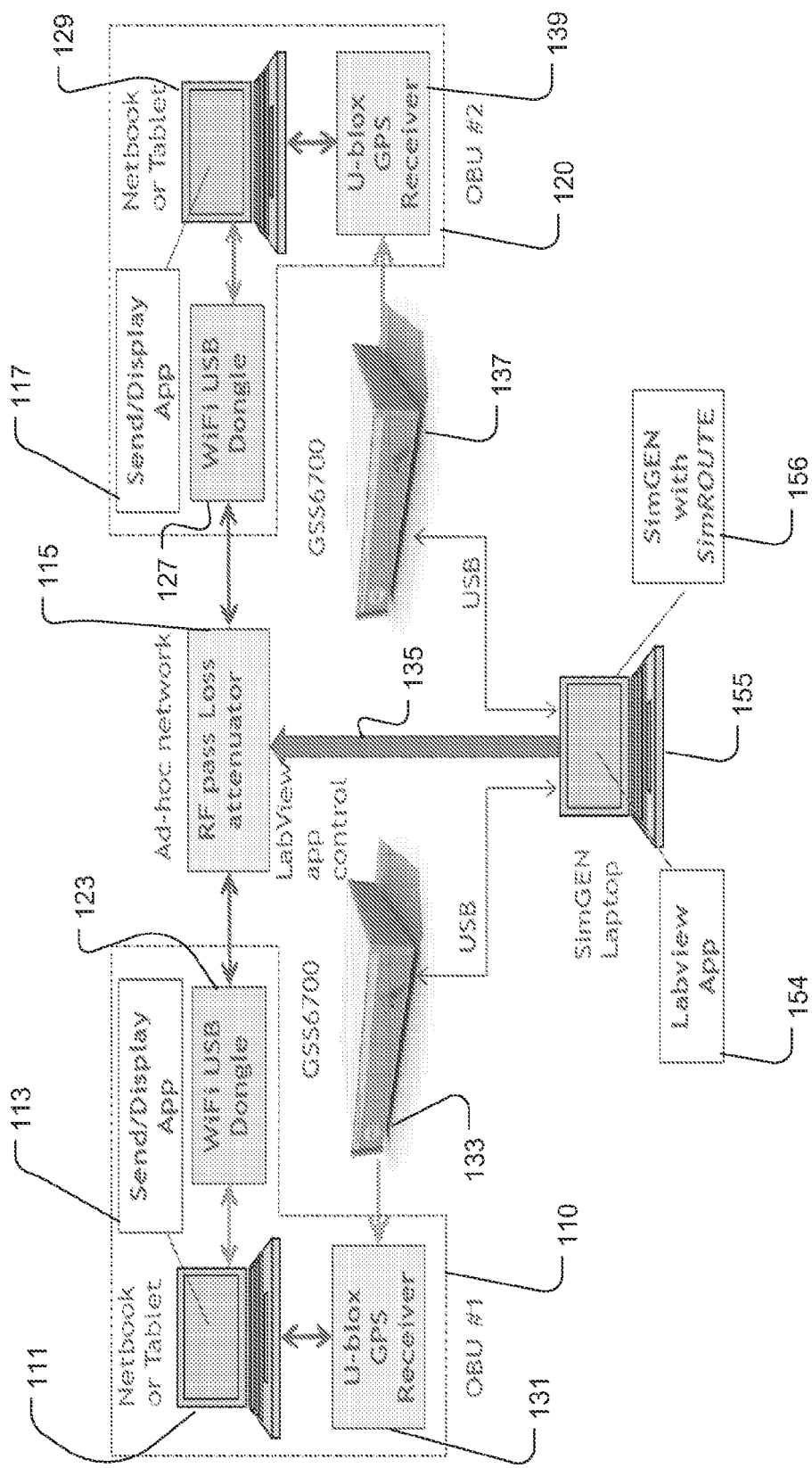
FIG. 1 is a high level block diagram of a two-vehicle concept demonstrator that is a starting point for building a more comprehensive scenario FIG. 2 further illustrates components of a multiple path attenuator to individually control strengths of signals exchanged.
Figure 2:
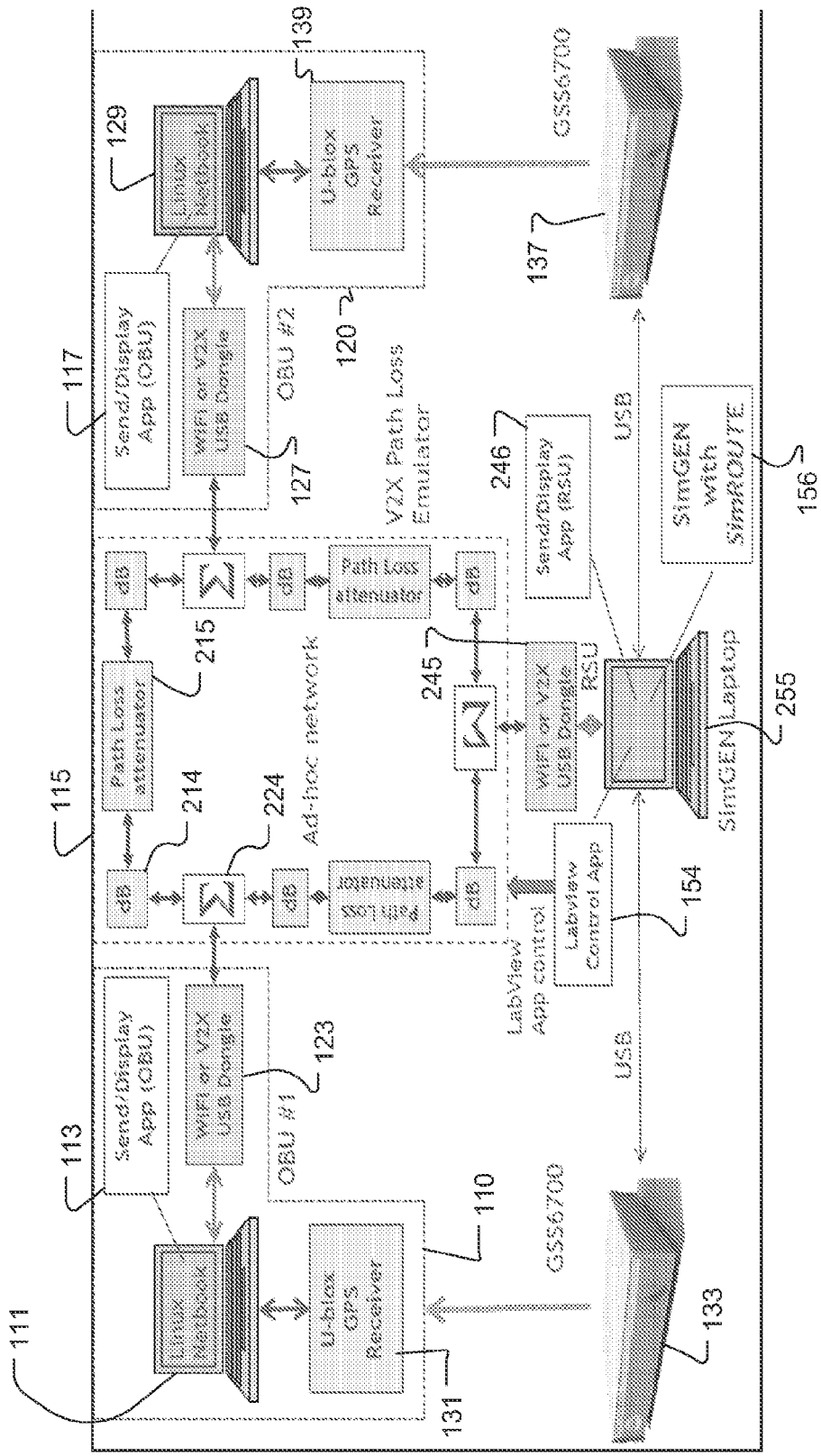
Figure 3:
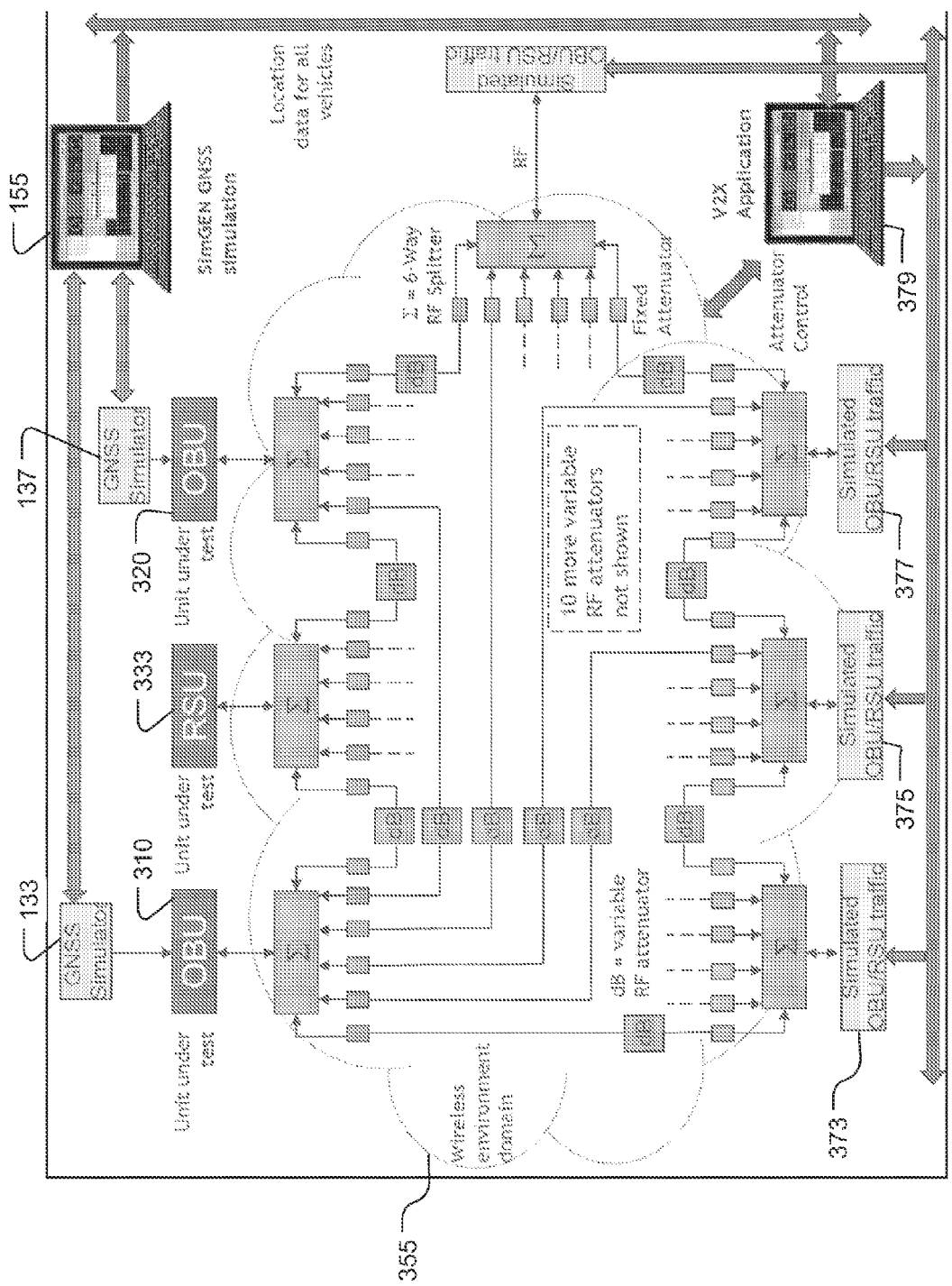
FIG. 3 is a high level block diagram of a test system that can emulate more than three RF channels signals.

A detailed description of implementations of the technology disclosed is provided with reference to the FIGS. 1-3.

The technology disclosed bridges the gap between field trials and pure computer simulation by synthesizing the dynamic radio environment in the laboratory, harnessing the power of computer simulation whilst including in-vehicle hardware and software.

Glossary of Terms

Connected Vehicle means a vehicle equipped with navigation, proximity and other sensors which may communicate via radio signals in a coordinated way with other similarly equipped vehicles and roadside infrastructure for the purposes of road safety, traffic management, data transfer or similar applications.

On Board Unit (OBU) means a package of electronics and associated sensors that, when installed in a target vehicle, provide the 'Connected vehicle' functionality. Such sensors may include, but not be limited to, GPS, Radar, Lidar, Infrared and wheel motion.

Roadside Unit (RSU) means a communication transceiver installed alongside traffic networks which may communicate with Connected Vehicles.

Discussion

Research and development of complex systems for automotive traffic management applications usually involves extensive use of special test vehicles and non-public test tracks. This is a typical approach to using hardware OBUs and associated sensors in a somewhat realistic environment.

The logistics associated with such activities, however, in both human and infrastructure resource is high.

Tests can result in high attrition rates of vehicle assets when collision scenarios are included. Tests can generate significant safety issues when human interaction is required.

On test tracks, it is virtually impossible to repeat test scenarios exactly. This limits the ability of test track work to compare the effectiveness of different solutions, particularly when elements such as the use of live GPS navigation signals are included.

Sophisticated computer simulations of the test track test scenarios could be used to emulate the output data associated with the various sensors, to both reduce the need to employ test tracks and to maximize the effectiveness of test tracks.

Pure computer simulations of vehicle movements and predicted or modeled communication signal conditions cannot be used directly to stimulate actual OBU hardware with a view to establishing typical system performance and OBU behavior across a range of simulated real-world test cases.

To use actual or simulated OBU hardware, technology is disclosed routes RF signals over a coaxial cable. One or more variable RF attenuators are positioned along the coaxial cable to emulate the characteristics of the modeled communication signal conditions. For instance, a variable RF attenuator can be installed between the RF antenna ports of two OBUs, on the coaxial cable. The variable RF attenuator is controlled to represent the attenuation in the RF channel between the OBUs, which are in motion and at dynamically changing locations.

The calculated RF attenuation would be a function of one or more of:
- the physical separation of the two simulated vehicles in accordance with the standard RF signal Free space path loss equation (see below);
- a random fading element due to multipath interaction;
- attenuation as a result of physical obstructions (buildings) which may also be modelled using city landscapes, if available, or pseudorandom attenuations representing typical buildings; or
- the effects of imperfect antenna gain patterns for both transmission and reception.

A channel emulator can be used to emulate radio channel characteristics such as fading, noise, etc. The channel emulator can be, for example, a Spirent SR5500 Wireless Channel Emulator manufactured by Spirent Communications, PLC of Eatontown, N.J.

One model for Free-Space Path Loss (FSPL) is:

$$FSPL = \left(\frac{4\pi d}{\lambda}\right)^2$$

$$= \left(\frac{4\pi df}{c}\right)^2$$

where:
- $\lambda$ is the signal wavelength (in meters),
- f is the signal frequency (in hertz),
- d is the distance from the transmitter (in meters),
- c is the speed of light in a vacuum, $2.99792458 \times 10^8$ meters per second.

Another model is a two-slope model that can be used to describe flat fading, residential, small office, large office, indoor or outdoor space.

Random fading also can be applied using a Rayleigh or Rican fading model.

Any of these models can be combined with sector impaired simulation of obstructions or another model of attenuation resulting from physical obstructions. In this variation, the C2x or V2x simulation applies includes directional attenuation parameters to indicate obstructions, including other vehicles. The points of a compass can be sectored, for instance into four, eight or 16 sectors and values encoded for attenuation resulting from obstructions in whatever directions obstructions have been recorded or are present. Shadow fading also may be applied. In shadow fading, the RF power from the AP fluctuates with a Gaussian, normal or other distribution about the mean power.

Imperfect antenna gain also can be factored into the model. Antennas often are less than perfectly omnidirectional, in part due to adjacent masses. On vehicle, antennas mounted on the roof or windshield can be partially obstructed for both transmission and reception along various lines. Attenuation and dominance of line of sight over multipath signals can depend on an angle between transmitting and receiving antennas.

FIG. 1 is a high level block diagram of a two-vehicle concept demonstrator that is a starting point for building a more comprehensive scenario, which might include traffic from tens or hundreds of vehicles. In this simulator, there are two onboard units 110, 120. The OBUs can be emulated using a netbook, tablet or laptop 111, 129, a WiFi USB dongle 123, 127, and a u-blox GPS receiver 131, 139. One or more applications run on the hardware 111 to emulate behavior of the emulated OBUs including sending, receiving and processing position and ad-hoc network signals. In some implementations, an application 113, 117 handles sending of signals, display of current status and logging or sharing of performance parameters. The application can run algorithms under development. Alternatively, a breadboard, prototype or production OBU (hardware OBU) can be used instead of generic hardware 111, 129. A hardware OBU may be monitored by hardware 111, 129 or by the simulation controlling hardware 155.

The position of each vehicle can be simulated by a coordinating application on a separate workstation 155. In some implementations, the workstation 155 runs SimGEN software with SimROUTE 156 adapted to V2x simulation. These programs have been developed by assignee Spirent Communications. The workstation 115 also can run Labview 154 or a similar program to control instruments. Labview is a commercially available product.

A pair of GNSS simulators 133, 137 are indicated to supply position signals to the OBSs 110, 120. The GSS6700 unit available from Spirent can be adapted to this use. In some implementations, a GNSS unit could generate position signals for more than one receiver. Or, one GNSS unit could be provided for each OBU being tested.

A path loss instrument 115 attenuates WiFi signals directed to the receivers 123, 127 of the OBUs. In the simple case of just two OBUs communicating with each other, an attenuator positioned between the dongles may be sufficient to introduce bidirectional, symmetrical path loss. The Labview software can be used to control an attenuator. A channel emulator such as the SR5500 or VR5 produced by Spirent may be used when additional capabilities such as emulation of multipathing are desired.

FIG. 2 shows an extension of the two-vehicle/OBU concept demonstrator to include a road side unit (RSU) 255 and emulation of the three resulting RF signal channels. This system can include ad hoc mesh networking, in which one of the three units forwards messages that cannot be directly communicated. This extension allows, for example, the demonstration of message distribution scenarios from the RSU 255 to OBU 120 via OBU 110 when communications between the RSU 255 and OBU 120 are interrupted. In this figure, many reference numbers have been reused to indicate components that are similar or identical to components in FIG. 1. This figure adds having the hardware 255 (previously 155) emulate the roadside unit, as well as controlling the GNSS sources 133, 137 and the attenuator or channel emulator 115. Emulating the RSU from shared function hardware 255 is a convenient option. Additional hardware can be provided to isolate overall emulation control from emulation of the RSU. In order for the hardware 255 to emulate an RSU, a WiFi or V2x USB dongle 245 needs to send and receive signals emulating the RSU. One or more applications, such as a send/display application 246 running on the hardware 255 emulate the behavior of the RSU. Alternatively, a breadboard, prototype or production RSU (hardware RSU) can be used instead of having generic hardware 111, 129. A hardware RSU may be monitored by the simulation controlling hardware 255 or by additional hardware. Because the RSU is at a fixed location (or multiple fixed locations), it is not necessary for a GNSS emulator to supply signals to the RSU.

FIG. 2 further illustrates components of a multiple path attenuator to individually control strengths of signals exchanged among the multiple WiFi dongles 123, 245, 127. In the block 115, multiple instances of signal combiners (Σ) 224, signal strength detectors (dB) 214 and path loss attenuators 215 are illustrated. The number and arrangement of these components can vary. In the configuration conceptually illustrated, each device-to-device path is separately controlled by Labview or other software 154. As above, a more sophisticated system could replace the attenuator 115 with a channel emulator that is more flexible.

A more elaborate implementation is show in FIG. 3. This test system can emulate more than three RF channels signals. This implementation can be used to test the performance of actual breadboard, prototype or production (hardware) OBU 310 when presented with coherent RF traffic from another actual OBU 320, from an emulated or hardware RSU 333 (both of which could be considered as 'under-test' also) and from a plurality of synthesized OBUs 373, 375, 377, 359. The implementation 355 shown supports seven RF ports, each of which is connected to each of the others via a dedicated variable attenuator in a matrix. The attenuators are controlled by an attenuator control of a V2x application running on hardware 379 to represent calculated signal free-space path losses between OBUs/vehicles and RSUs in the simulated environment. More or fewer RF ports and attenuators could be supported in other implementations. Channel emulation could replace simple attenuation in some implementations.

The GPS RF source for the actual OBUs 310, 320 would be provided by GNSS or GPS simulators 133, 137 as in the concept demonstrator of FIG. 1. The emulated OBU/RSUs 373, 375, 377, 359 would report their positions under control of the V2x application 379, rather than processing GNSS signals. The synthesized RF transmissions could be generated using either a soft radio platform or dedicated hardware capable of sequentially generating specific independent V2X messages from simulated vehicles (one per vehicle) at the V2X frequencies and with the requisite modulation. These would normally support transmission only but could also incorporate a flexible receiver for radio traffic monitoring.

This figure illustrates use of separate hardware for a V2x application 379 and general positional simulation 155. This is for convenience of understanding. More or fewer hardware components could be used to run the applications involved.

In this scenario, each port in the matrix can be considered either as representing a single vehicle or a group of vehicles. Vehicles can be grouped when they are close together. They also can be grouped when they are far enough away to produce marginal signals.

When representing a group of vehicles, the transmitted messages would be constructed such that they contained information relevant to the simulated vehicle and potentially relating to neighboring vehicles, enriching the complexity of the messages generated. A group size could be up to around 50 vehicles, up to 100 vehicles or more for crowded highway scenarios. Messages could be spread in a representative manner across relevant and appropriate frequency channels. The variable attenuator would reflect the distance from the group of vehicles to vehicles connected to other ports. Within each group, local power level variation due to localized signal fading or signal shading can be applied to each signal by varying the amplitude of each message within the group.

The vehicle trajectories in any particular test scenario may be derived from a range of sources. For small scale systems and for vehicles that are the focus of attention, the in-built motion generators of the GNSS simulator can be used. Trajectories can also be created from map-based tools such as Spirent's "SimROUTE™" which is built around Google Maps™.

For larger scale systems, the system would benefit from integration with pure simulations of vehicular traffic that generate the attendant synthetic message streams. SimGEN is able to accept trajectories for multiple vehicles in real time using its SimROUTE interface. Vehicles have specific numbered identifiers allowing SimGEN to select and deal with specific vehicles from a denser data stream. The remainder would be handled by the V2X application shown in FIG. 3, and would in turn map message streams to appropriate modems and also set the attenuators accordingly between the virtual vehicles and the devices under test as well as between the devices under test themselves.

The outputs of external simulations can be delivered in real time, or may be pre-processed into attenuator drive files by a non-real-time application. The file contents may be applied to the attenuators in synchronism with the GNSS simulation using existing timing and synchronization tools. Separate files would contain the V2X message data generated by the virtual vehicles. Pre-processed high-vehicle-density scenarios would also offer the ability to overlay complex fading simulations without dramatically increasing the processing capacity of the computing platform.

Additional ports could be added to the matrix by using RF splitters with more outputs and adding the required number of variable attenuators and coaxial signal paths. Implementation of the path emulators and ports would be organized using modular sub-systems comprising a splitter and a number of variable attenuators that can be interconnected as required, creating a scalable test system.

The system may equally well be scaled down to one using fewer ports, as required.

In addition, the mix of actual OBUs and synthetic OBUs can be changed. Replacing a synthetic source with another OBU, for example, could test message relay, where OBU#2 passes-on a message from OBU#1 to OBU#3.

Broadband components would be used to cover the range of carrier frequencies implemented globally for V2X, ranging from 700 MHz to 6 GHz. Calculations of path loss would automatically account for different carrier frequencies.

Using the disclosed emulation, one can avoid repeating extensive field tests or experiments simply because something small but important has changed, for example, a new sensor added to the array of possible sensors (GNSS, radar, LIDAR, etc.). One can simply add an emulation of the new sensor to the laboratory solution. The laboratory solution can be rerun with the new sensor operating synchronously and coherently with the other sensor emulations and GNSS and vehicle motion simulations.

Particular Implementation

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

One implementation describes a method of testing vehicle-to-vehicle or vehicle-to-roadside unit (C2x or V2x) performance. This method includes connecting communication transceivers of first and second on board units, abbreviated OBUs, to an attenuator network. The attenuator network may be part of a test harness. The method further includes connecting positioning signal receivers of the first and second OBUs to one or more GNSS emulators. It includes controlling the attenuator network and the GNSS emulators with a simulation controller. The simulation controller: tracks simulated positions of the first and second OBUs; controls the attenuator network to simulate signal attenuation between the first and second OBUs; and controls the GNSS emulators to provide signals based on the simulated positions of the first and second OBUs.

In some implementations, the method further includes logging behavior of the OBUs responsive to test stimulus.

This method and others described in this disclosure can be combined with one or more of the following features.

In some implementations, the method further includes connecting at least one communication transceiver of a roadside unit, abbreviated RSU, to the attenuator network and controlling the attenuator network to individually attenuate each communication channel among the OBUs and RSU.

In some implementations, the method further includes connecting one or more communication transceivers of a plurality of synthetic OBUs to the attenuator network and controlling the attenuator network to individually attenuate each communication channel among the OBUs, the synthetic OBUs and RSU, wherein the synthetic OBUs generate communications and have simulated positions, under control of the simulation controller.

In some implementations, the attenuator network comprises a channel emulator that generates multipath signals for at least one communication channel between units connected to the attenuator network.

In some implementations, the simulation controller controls the attenuator network to simulate attenuation resulting from obstructions. The simulation controller can control the attenuator network to simulate attenuation resulting from imperfect antenna gain patterns. The simulation controller can control the attenuator network to simulate attenuation resulting from random fading.

The methods disclosed and their various aspects also can be practiced as a device capable of practicing the method or as a non-transitory computer readable storage medium including computer program instructions that when executed on an appropriate device, cause the device to practice the method.

One device implementation describes a device for testing on board units, abbreviated OBUs, and at least one roadside unit, abbreviated RSU; This device includes first and second communication signal ports adapted for connection with first and second OBUs; and first and second positioning signal ports adapted for connection with first and second OBUs. It includes an attenuation network controllable to provide individual communication channel attenuation of each communication channel being simulated. The attenuation network is coupled between the communication signal ports. In some implementations, it includes one or more GNSS emulators coupled to the positioning signal ports. In other implementations, it supports control of one more GNSS emulators that can be coupled to the positioning signal ports. The device includes a simulation controller that: tracks simulated positions of the first and second OBUs; controls the attenuator network to simulate signal attenuation on the individual communication channels; and controls the GNSS emulators to provide signals based on the simulated positions of the first and second OBUs. In some implementations, the simulation controller further logs behavior of the OBUs responsive to test stimulus.

This device and other devices described herein can further include components that practice any of the method features described. It also can be practiced as a computer readable storage medium that, when combined with appropriate hardware, creates any of the devices described. This and other devices can include one or more of the following features. One device implementation can include at least one third communication signal port adapted for connection with at least one roadside unit, abbreviated RSU, coupled to the attenuation network. The simulation controller individually attenuates each communication channel among the OBUs and the RSU.

A device implementation can further include at least one fourth communication signal port adapted for connection with at least one synthetic OBU, coupled to the attenuation network. The simulation controller individually attenuates each communication channel among the OBUs, the synthetic OBUs and the RSU.

A device implementation can further include at least one fourth communication signal port adapted for connection with at least one synthetic OBU, coupled to the attenuation network. The simulation controller individually attenuates each communication channel among the OBUs, the synthetic OBUs and the RSU.

What is claimed is:

1. A method of testing vehicle-to-vehicle or vehicle-to-roadside unit (V2x) performance, including:
    connecting communication transceivers of first and second on board units (OBUs) to an attenuator network;
    connecting positioning signal receivers of the first and second OBUs to one or more GNSS emulators;

controlling the attenuator network and the GNSS emulators with a simulation controller, wherein the simulation controller:
  tracks simulated positions of the first and second OBUs;
  controls the attenuator network to simulate signal attenuation between the first and second OBUs; and
  controls the GNSS emulators to provide signals based on the simulated positions of the first and second OBUs; and further including logging behavior of the OBUs responsive to a test stimulus.

2. The method of claim 1, further including connecting at least one communication transceiver of a roadside unit (RSU) to the attenuator network and controlling the attenuator network to individually attenuate each communication channel among the OBUs and RSU.

3. The method of claim 1, further including connecting one or more communication transceivers of a plurality of synthetic OBUs to the attenuator network and controlling the attenuator network to individually attenuate each communication channel among the OBUs, the synthetic OBUs and a road side unit (RSU), wherein the synthetic OBUs generate communications and have simulated positions, under control of the simulation controller.

4. The method of claim 2, further including connecting one or more communication transceivers of a plurality of synthetic OBUs to the attenuator network and controlling the attenuator network to individually attenuate each communication channel among the OBUs, the synthetic OBUs and RSU, wherein the synthetic OBUs generate communications and have simulated positions, under control of the simulation controller.

5. The method of claim 1, wherein the attenuator network comprises a channel emulator that generates multipath signals for at least one communication channel between units connected to the attenuator network.

6. The method of claim 1, wherein the simulation controller controls the attenuator network to simulate attenuation resulting from obstructions.

7. The method of claim 1, wherein the simulation controller controls the attenuator network to simulate attenuation resulting from imperfect antenna gain patterns.

8. The method of claim 1, wherein the simulation controller controls the attenuator network to simulate attenuation resulting from random fading.

9. A device for testing on board units (OBUs) and at least one roadside unit (RSU), the device including:
  first and second communication signal ports adapted for connection with first and second OBUs;
  first and second positioning signal ports adapted for connection with first and second OBUs;
  an attenuation network that includes individual communication channel attenuation of each communication channel being simulated, wherein the attenuation network is coupled between the communication signal ports;
  one or more global navigational satellite system (GNSS) emulators coupled to the positioning signal ports;
  a simulation controller that:
    tracks simulated positions of the first and second OBUs;
    controls the attenuator network to simulate signal attenuation on the individual communication channels;
    controls the GNSS emulators to provide signals based on the simulated positions of the first and second OBUs; and further
    logs behavior of the OBUs responsive to a test stimulus.

10. The device of claim 9, further including:
  at least one third communication signal port adapted for connection with at least one roadside unit abbreviated (RSU1) coupled to the attenuation network;
  wherein the simulation controller individually attenuates each communication channel among the OBUs and the RSU.

11. The device of claim 9, further including:
  at least one third communication signal port adapted for connection with at least one synthetic OBU, coupled to the attenuation network;
  wherein the simulation controller individually attenuates each communication channel among the OBUs, the synthetic OBUs and the RSU.

12. The device of claim 10, further including:
  at least one fourth communication signal port adapted for connection with at least one synthetic OBU, coupled to the attenuation network;
  wherein the simulation controller individually attenuates each communication channel among the OBUs, the synthetic OBUs and the RSU.

13. A non-transitory computer readable medium storing computer program instructions that, when executed on a device connected to an attenuation network that communicatively couples on board units (OBUs), the device further connected to one or more global navigation satellite system (GNSS) emulators that are communicatively coupled to the OBUs, cause the device to:
  track simulated positions of first and second OBUs;
  control the attenuator network to simulate signal attenuation on the individual communication channels;
  control the GNSS emulators to provide signals based on the simulated positions of the first and second OBUs; and
  log behavior of the OBUs responsive to a test stimulus.

14. The non-transitory computer readable medium of claim 13, wherein the attenuation network is further coupled to at least one communication transceiver of a roadside unit (RSU), further including computer program instructions that cause the device to individually attenuate each communication channel among the OBUs and RSU.

15. The non-transitory computer readable medium of claim 14, wherein the attenuation network is further coupled to a plurality of synthetic OBUs, further including computer program instructions that cause the device to individually attenuate each communication channel among the OBUs, the synthetic OBUs and RSU, and to cause the synthetic OBUs to generate communications and have simulated positions.

16. The non-transitory computer readable medium of claim 13, wherein the attenuation network is further coupled to a plurality of synthetic OBUs, further including computer program instructions that cause the device to individually attenuate each communication channel among the OBUs, the synthetic OBUs and a road side unit (RSU), and to cause the synthetic OBUs to generate communications and have simulated positions.

* * * * *